US011140082B2

(12) United States Patent
Shen et al.

(10) Patent No.: US 11,140,082 B2
(45) Date of Patent: Oct. 5, 2021

(54) DATA TRANSMISSION METHOD AND DEVICE

(71) Applicant: HUAWEI TECHNOLOGIES CO., LTD., Guangdong (CN)

(72) Inventors: Li Shen, Nanjing (CN); Hong Zhou, Nanjing (CN); Tao Wu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 83 days.

(21) Appl. No.: 16/699,352

(22) Filed: Nov. 29, 2019

(65) Prior Publication Data

US 2020/0099620 A1 Mar. 26, 2020

Related U.S. Application Data

(63) Continuation of application No. PCT/CN2018/085942, filed on May 8, 2018.

(30) Foreign Application Priority Data

Jun. 1, 2017 (CN) ......................... 201710403008.6

(51) Int. Cl.
*H04L 12/803* (2013.01)
*H04L 12/801* (2013.01)
(Continued)

(52) U.S. Cl.
CPC .......... *H04L 47/125* (2013.01); *H04L 47/196* (2013.01); *H04L 47/28* (2013.01);
(Continued)

(58) Field of Classification Search
CPC ..... H04L 47/125; H04L 47/196; H04L 47/28; H04L 61/2517; H04L 61/6063; H04L 69/164; H04L 5/1469
See application file for complete search history.

(56) References Cited

U.S. PATENT DOCUMENTS

| | | | |
|---|---|---|---|
| 9,264,336 | B2 | 2/2016 | Cociglio et al. |
| 2009/0175356 | A1 | 7/2009 | Hagemeier et al. |

(Continued)

FOREIGN PATENT DOCUMENTS

| | | | |
|---|---|---|---|
| CN | 101141320 | A | 3/2008 |
| CN | 102804842 | A | 11/2012 |

(Continued)

OTHER PUBLICATIONS

Chen H et al: "Load balancing without packet reordering in NVO3; draft-chen-nvo3-load-banlancing-00. txt", Standard Working Draft, Internet Society (ISOC) 4, Rue Des Falaises CH—1205 Geneva, Switzerland, Oct. 27, 2014 (Oct. 27, 2014), pp. 1-11, XP015102620.

(Continued)

*Primary Examiner* — Charles C Jiang
*Assistant Examiner* — Shawn D Miller

(57) ABSTRACT

This application provides a data transmission method. The method includes: calculating a first duration based on at least one to-be-sent data flow and a first time interval, where the first time interval is a preset value, and different data flows in the at least one to-be-sent data flow have different 5-tuples; and sending a first data flow, where the first data flow belongs to the at least one to-be-sent data flow; where a first set of packets of the first data flow are sent in a first time period, a second set of packets of the first data flow are sent in a second time period following a second time interval, a duration of the first time period and a duration of the second time period are equal to the first duration, and the second time interval is greater than or equal to the first time interval.

20 Claims, 11 Drawing Sheets

(51) Int. Cl.
*H04L 12/841* (2013.01)
*H04L 29/12* (2006.01)
*H04L 29/06* (2006.01)

(52) U.S. Cl.
CPC ...... *H04L 61/2517* (2013.01); *H04L 61/6063* (2013.01); *H04L 69/164* (2013.01)

(56) References Cited

U.S. PATENT DOCUMENTS

| | | | |
|---|---|---|---|
| 2010/0318660 | A1 | 12/2010 | Balasubramanian et al. |
| 2012/0207020 | A1* | 8/2012 | Li ........................ H04L 47/125 370/235 |
| 2013/0223274 | A1 | 8/2013 | Cociglio et al. |
| 2015/0163144 | A1 | 6/2015 | Koponen et al. |
| 2016/0028608 | A1* | 1/2016 | Dasgupta ................ H04L 43/16 370/252 |
| 2017/0085485 | A1 | 3/2017 | Vanini et al. |
| 2017/0099625 | A1* | 4/2017 | Li ........................ H04W 76/16 |
| 2017/0171075 | A1* | 6/2017 | Sajeepa ................ H04L 45/745 |
| 2017/0188407 | A1* | 6/2017 | Zee .................. H04W 36/0027 |

FOREIGN PATENT DOCUMENTS

| | | | |
|---|---|---|---|
| CN | 103262471 | A | 8/2013 |
| CN | 104023006 | A | 9/2014 |
| CN | 104539483 | A | 4/2015 |
| CN | 105591974 | A | 5/2016 |
| WO | 2016062106 | A1 | 4/2016 |
| WO | 2016128179 | A1 | 8/2016 |

OTHER PUBLICATIONS

Rojas-Cessa Roberto et al: "Schemes for Fast Transmission of Flows in Data Center Networks", IEEE Communication Surveys and Tutorials, vol. 17, No. 3, Third Quarter 2015, pp. 1391-1422, XP011667208.

Mohammad Alizadeh et al. "CONGA: Distributed Congestion-Aware Load Balancing for Datacenters", Cisco Systems, SIGCOMM'14, Aug. 17-22, 2014 (12 pages).

International Search Report for PCT/CN2018/085942, dated Jul. 17, 2018, 4 pages.

* cited by examiner

Figure 3:
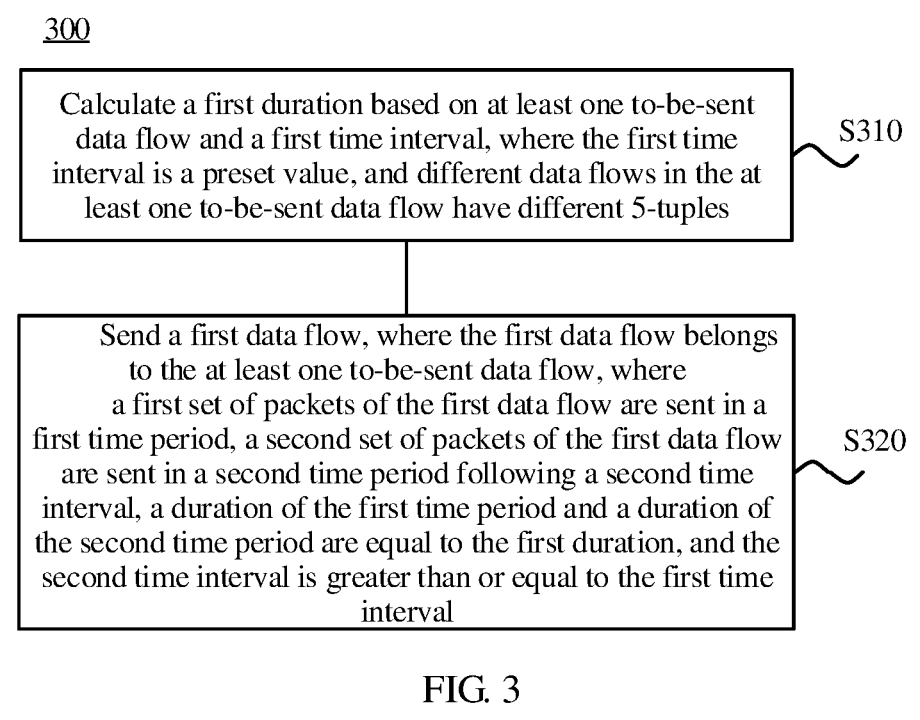

300

Calculate a first duration based on at least one to-be-sent data flow and a first time interval, where the first time interval is a preset value, and different data flows in the at least one to-be-sent data flow have different 5-tuples

S310

Send a first data flow, where the first data flow belongs to the at least one to-be-sent data flow, where a first set of packets of the first data flow are sent in a first time period, a second set of packets of the first data flow are sent in a second time period following a second time interval, a duration of the first time period and a duration of the second time period are equal to the first duration, and the second time interval is greater than or equal to the first time interval

DATA TRANSMISSION METHOD AND DEVICE

CROSS-REFERENCE TO RELATED APPLICATIONS

This application is a continuation of International Application No. PCT/CN2018/085942, filed on May 8, 2018, which claims priority to Chinese Patent Application No. 201710403008.6, filed on Jun. 1, 2017. The disclosures of the aforementioned applications are hereby incorporated by reference in their entireties.

TECHNICAL FIELD

This application relates to the communications field, and more specifically, to a data transmission method and device.

BACKGROUND

In a communications network, data center (DC) networks are more widely created by cloud service providers and enterprises. In addition, a load balancing effect of a data center network on network traffic is directly related to user experience.

During network traffic load balancing, a packet loss may occur due to network congestion. Packets are lost due to network congestion in mainly two cases: 1. Local load is unbalanced, for example, in an equal cost multi-path (ECMP) mode and a VLB mode. In these two modes, only quantities of flows can be balanced. Because data flows have different sizes, traffic cannot be balanced. A plurality of large flows may be mapped to a same link, and consequently a size of aggregated traffic exceeds a port capacity and congestion occurs. 2. Because leaf switches perform load balancing separately, a plurality of large flows on a plurality of leaf switches destined for a same leaf may be sent to a same spine switch, resulting in downlink traffic aggregation and congestion. Due to network congestion in these two cases, a large flow may occupy all bandwidth of a link, and a small flow cannot be forwarded. When several large flows are scheduled to a same link, bandwidth for the large flows is insufficient and a packet loss occurs.

Therefore, how to address congestion and a packet loss caused by network traffic load imbalance to increase data transmission reliability is an urgent problem to be resolved.

SUMMARY

This application provides a data transmission method and device, to periodically insert a delay between two adjacent packet groups of a data flow, to actively construct a sub-flow. This splits a large flow, eliminates continuous congestion on a port of a switched network, brings a good load balancing effect, and features easy implementation. Further, congestion and a packet loss caused by network traffic load imbalance are addressed, and data transmission reliability is increased.

According to a first aspect, an embodiment of this application provides a data transmission method, including: calculating a first duration based on at least one to-be-sent data flow and a first time interval, where the first time interval is a preset value, and different data flows in the at least one to-be-sent data flow have different 5-tuples; and sending a first data flow, where the first data flow belongs to the at least one to-be-sent data flow, where a plurality of packets of the first data flow are sent in a first time period, packets of the first data flow are sent in a second time period following a second time interval, a duration of the first time period and a duration of the second time period are equal to the first duration, and the second time interval is greater than or equal to the first time interval.

Optionally, the data transmission method may be performed by a remote direct memory access (RDMA) network adapter, or may be performed by a top of rack (TOR) access switch.

Therefore, according to the data transmission method in this embodiment of this application, when at least one data flow is to be sent, a sub-flow is actively constructed for the data flow. This splits the data flow, and eliminates continuous congestion on a port of a switched network.

Further, when a switch supports a flowlet load balancing function, a load balancing effect is good, and implementation is easy.

Optionally, in an implementation of the first aspect, the method further includes:

skipping sending a packet of the first data flow in the second time interval.

Optionally, a packet of a data flow in the at least one to-be-sent data flow other than the first data flow is sent in the second time interval.

Optionally, in an implementation of the first aspect, packets sent in the second time interval belong to different data flows.

Optionally, in an implementation of the first aspect, the method further includes:

setting different user datagram protocol (UDP) source port numbers or transmission control protocol (TCP) source port numbers respectively for the packets that are sent in the second time interval and that belong to different data flows.

Optionally, in an implementation of the first aspect, the method further includes:

setting different UDP source port numbers for the packets sent in the first time period and the second time period respectively.

Optionally, in an implementation of the first aspect, the method further includes:

setting a same UDP source port number for packets sent in one first duration.

Therefore, according to the data transmission method in this embodiment of this application, a different UDP source port number is set for each sub-flow of one data flow, so that load balancing of each sub-flow can be implemented when a switch supports an ECMP load balancing function based on a 5-tuple hash, and further congestion and a packet loss caused by network traffic load imbalance are addressed, and data transmission reliability is increased.

Optionally, in an implementation of the first aspect, the calculating a first duration based on at least one to-be-sent data flow and a first time interval includes:

determining a quantity of to-be-sent data flows, where the first duration≥the first time interval/(the quantity of to-be-sent data flows−1).

Optionally, in an implementation of the first aspect, the determining a quantity of to-be-sent data flows includes:

after a data flow is sent and/or a data flow is added, updating the quantity of to-be-sent data flows.

Optionally, in an implementation of the first aspect, the method further includes:

calculating, based on the first duration, a quantity of packets sent in one first duration; and the sending a first data flow includes:

continuously sending a plurality of packets of the first data flow, wherein a quantity of the plurality of packets is the same as the quantity of packets obtained through calculation, and continuously sending packets of the first data flow after the second time interval.

Optionally, in an implementation of the first aspect, the at least one to-be-sent data flow is a RDMA over Converged Ethernet v2 (RoCEv2) flow carried over a converged Ethernet.

According to a second aspect, an embodiment of this application provides a data transmission device, including a module or a unit that can perform the method in any one of the first aspect or the optional implementations of the first aspect.

According to a third aspect, a data transmission device is provided, including a memory, a transceiver, and a processor. The memory stores program code that can be used to instruct to perform the first aspect or any optional implementation of the first aspect, and the transceiver is configured to perform specific signal sending and receiving when driven by the processor. When the code is executed, the processor may implement each operation executed by the device in the method.

According to a fourth aspect, a computer storage medium is provided. The computer storage medium stores program code, and the program code is used to indicate an instruction used to perform the method in any one of the first aspect or the possible implementations of the first aspect.

According to a fifth aspect, a computer program product that includes an instruction is provided. When the computer program product is run on a computer, the computer performs the method in the foregoing aspects.

BRIEF DESCRIPTION OF DRAWINGS

FIG. 3 is a schematic diagram of a data transmission method according to an embodiment of this application;

DESCRIPTION OF EMBODIMENTS

The following describes the technical solutions in embodiments of this application with reference to the accompanying drawings.

It should be understood that a data transmission method in example embodiments of this application may be applied to a switch (for example, a TOR access switch in a CLOS network), or may be applied to a network adapter (for example, a remote direct memory access network adapter integrated into a server). Specifically, the method in example embodiments of this application may be implemented on a switch or a chip of a network adapter. The following uses a CLOS network as an example to describe a data center network that applies the data transmission method in embodiments of this application. This is not limited in embodiments of this application.

Figure 1:
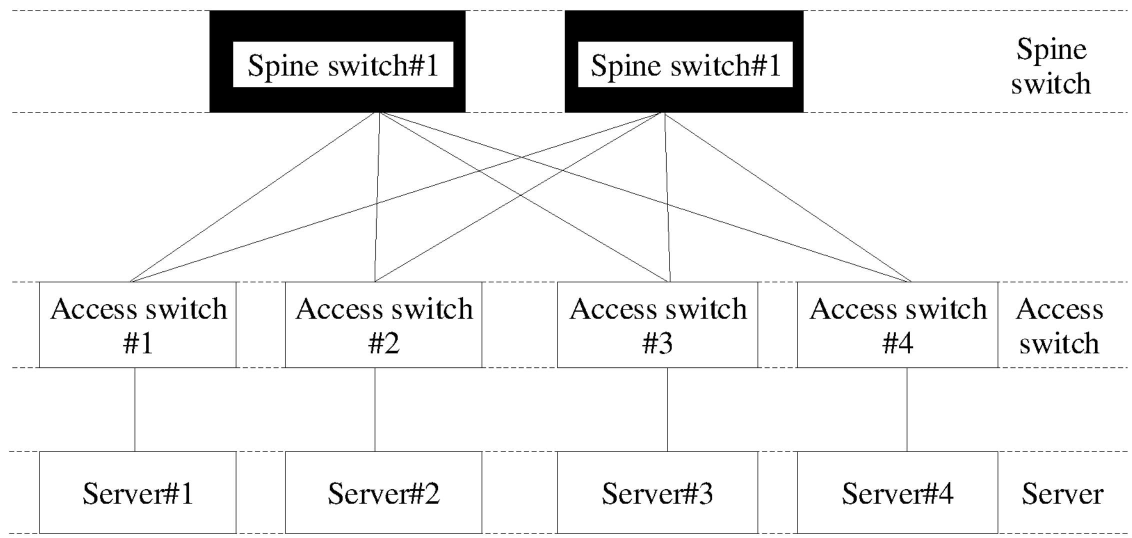
FIG. 1 is a schematic diagram of a data center network of a data transmission method according to an embodiment of this application.

FIG. 1 is a schematic diagram of a data center network of a data transmission method according to an embodiment of this application. As shown in FIG. 1, the data center network 100 is a level-2 CLOS network, and specifically includes two types of switches. One type is a TOR access switch, where a downlink port of the TOR access switch is connected to a server, and an uplink port of the TOR access switch is connected to a spine core switch. Another type is a spine switch, where the spine switch is configured to connect to a TOR access switch, and when servers connected to different TOR access switches communicate with each other, traffic passes through the spine switch.

In an embodiment, data transmission between the servers may be implemented by using the TOR access switches and the spine switches. For example, a server Server #1 sends a packet of a first data flow to Server #3. First, Server #1 sends the packet of the first data flow to TOR access switch #1. Then, TOR access switch #1 may send the packet of the first data flow to TOR access switch #3 by using SPINE switch #1, or TOR access switch #1 may send the packet of the first data flow to TOR access switch #3 by using SPINE switch #2. Finally, TOR access switch #3 sends the packet of the first data flow to Server #3. In this sending process of the first data flow, the data transmission method described in the embodiment of this application may be implemented at TOR access switch #1 and TOR access switch #3, or the data transmission method described in the embodiment of this application may be implemented at Server #1 and Server #3.

Figure 2:
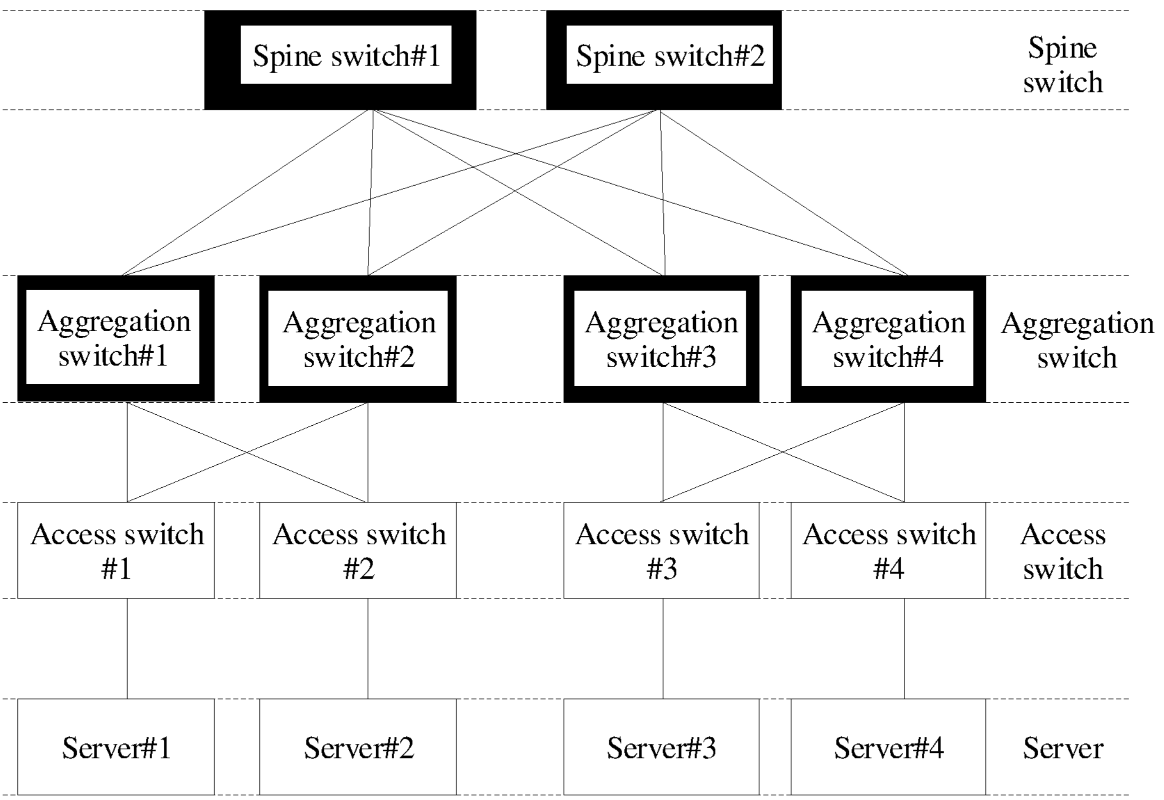
FIG. 2 is a schematic diagram of another data center network of a data transmission method according to an embodiment of this application.

FIG. 2 is a schematic diagram of another data center network of a data transmission method according to an embodiment of this application. As shown in FIG. 2, the data center network 200 is a three-level CLOS network, and specifically includes three types of switches. One type is a TOR access switch, where a downlink port of the TOR access switch is connected to a server, and an uplink port of the TOR access switch is connected to an aggregation (AGG) switch. Another type is an AGG switch, where a downlink port of the AGG switch is connected to a TOR access switch, and an uplink port of the AGG switch is connected to a spine switch. Still another type is a spine switch, where the spine switch is configured to connect to an AGG switch, and when servers connected to different TOR switches communicate with each other, traffic passes through the AGG switches and the spine switches.

In an embodiment, data transmission between the servers may be implemented by using the TOR switches, the AGG switches, and the spine switches. For example, a server Server #1 sends a packet of a first data flow to Server #2. First, Server #1 sends the packet of the first data flow to TOR access switch #1. Then, TOR access switch #1 may send the packet of the first data flow to SPINE #1 by using AGG switch #1, or TOR access switch #1 may send the packet of the first data flow to SPINE switch #2 by using AGG switch #1, or TOR access switch #1 may send the packet of the first data flow to SPINE switch #1 by using AGG switch #2, or TOR access switch #1 may send the packet of the first data flow to SPINE switch #2 by using AGG switch #2. Subsequently, when the packet of the first data flow is transmitted to SPINE switch #1, SPINE switch #1 may send the packet of the first data flow to TOR access switch #2 by using AGG switch #1, and SPINE switch #1 may send the packet of the first data flow to TOR access switch #2 by using AGG switch #2. When the packet of the first data flow is transmitted to SPINE switch #2, SPINE switch #2 may send the packet of the first data flow to TOR access switch #2 by using AGG switch #1, and SPINE switch #2 may send the packet of the first data flow to TOR access switch #2 by using AGG switch #2. Finally, TOR access switch #2 sends the packet of the first data flow to Server #2. For another example, the server Server #1 sends the packet of the first data flow to Server #2. First, Server #1 sends the packet of the first data flow to TOR access switch #1. Then, TOR access switch #1 may directly send the packet of the first data flow to TOR access switch #2 by using AGG switch #1, or TOR access switch #1 may directly send the packet of the first data flow to TOR access switch #2 by using AGG switch #2. Finally, TOR access switch #2 sends the packet of the first data flow to Server #2. In this sending process of the packet of the first data flow, the data transmission method described in the embodiment of this application may be implemented at TOR access switch #1 and TOR access switch #2, or the data transmission method described in the embodiment of this application may be implemented at Server #1 and Server #2.

It should be understood that the data center network 100 and the data center network 200 shown in FIG. 1 and FIG. 2 are only simple examples of the level-2 CLOS network and the level-3 CLOS network. During actual deployment, quantities of servers, TOR switches, AGG switches, and spine switches may be determined based on factors such as a network scale and an application type.

It should be further understood that this embodiment of this application may be further applied to another CLOS network, such as a four-level CLOS network or a higher-level CLOS network. This is not limited in embodiments of this application.

FIG. 3 is a schematic diagram of a data transmission method 300 according to an embodiment of this application. The method 300 may be executed by an RDMA network adapter integrated into a server, or may be executed by a TOR switch. The RDMA network adapter is used as an execution body below for description. As shown in FIG. 3, the method 300 includes the following steps.

S310. Calculate a first time interval based on at least one to-be-sent data flow and a first time interval, where the first time interval is a preset value, and different data flows in the at least one to-be-sent data flow have different 5-tuples.

Optionally, the at least one to-be-sent data flow is an RDMA over a converged Ethernet v2 (RoCEv2) flow carried over a converged Ethernet.

Optionally, the RoCEv2 data flow may be an ECMP load balancing flow based on a 5-tuple hash.

Optionally, a 5-tuple means a source internet protocol address (src IP), a destination internet protocol address (dst IP), an Internet protocol address protocol (IP protocol), a source port (src Port), and a destination port (dst Port).

Figure 4:
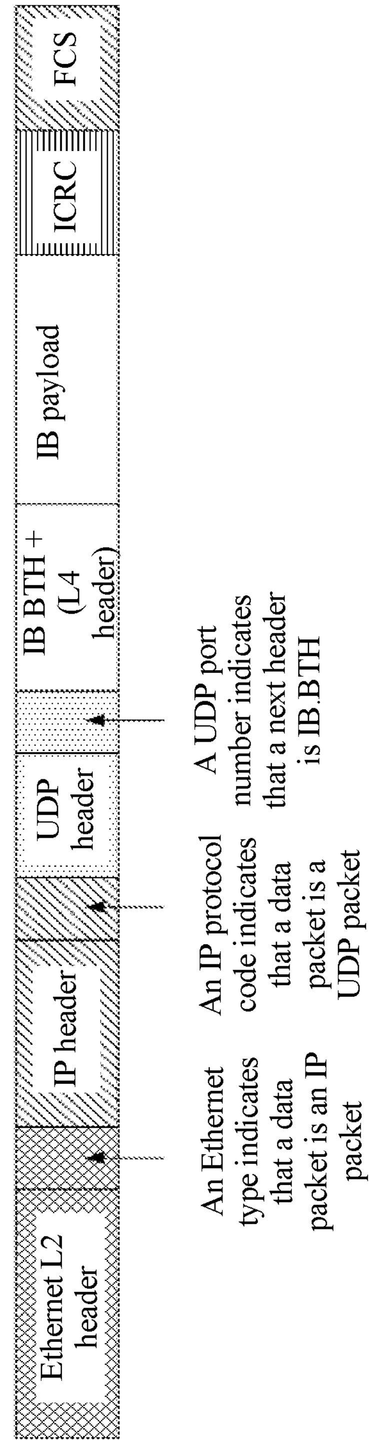
FIG. 4 is a schematic diagram of a RoCEv2 protocol according to an embodiment of this application.

Optionally, as shown in FIG. 4, in a data flow based on the RoCEv2 protocol, an Ethernet type may be used to indicate that a data packet is an IP data packet, an IP protocol number may be used to indicate that a data packet is a UDP data packet, and a UDP port number may be used to indicate that a next header is an IB.BTH (InfiniBand. base transport header).

Optionally, different data flows in the at least one to-be-sent data flow have different 5-tuples.

It should be understood that, if any element in a 5-tuple of one data flow is different from that of another data flow, the two data flows are different. For example, if a source port number in a 5-tuple of one data flow is different from that of another data flow, the two data flows are different.

It should be further understood that a same result may be obtained when 5-tuple hash operations are performed on different data flows.

It should be understood that, when packets of the at least one data flow are transmitted on a plurality of paths, there may be a delay difference between different paths in the plurality of paths.

Optionally, the first time interval is a preset value, and the first time interval is greater than or equal to a maximum path delay difference, which may be represented by Flowlet Gap.

Optionally, the first duration≥the first time interval/(the quantity of to-be-sent data flows−1). It should be understood that, the quantity of to-be-sent data flows is greater than or equal to 2 in this case.

Optionally, when the quantity of to-be-sent data flows is 1, the first duration is greater than or equal to the first time interval.

Optionally, after a data flow is sent and/or a data flow is added, the quantity of to-be-sent data flows may be updated.

S320. Send a first data flow, where the first data flow belongs to the at least one to-be-sent data flow.

A plurality of packets of the first data flow are sent in a first time period, packets of the first data flow are sent in a second time period following a second time interval, a duration of the first time period and a duration of the second time period are equal to the first duration, and the second time interval is greater than or equal to the first time interval.

It should be understood that after the first duration is determined, the RDMA network adapter periodically sends packets of the first data flow. Optionally, the RDMA network adapter may send the packets of the first data flow at the second time interval.

It should be further understood that the first time period and the second time period are only any two adjacent time periods for sending the first data flow. This is not limited in this embodiment of this application.

Optionally, the RDMA network adapter may send a same quantity of packets in each time period, for example, send five packets in a first time period, five packets in a second time period, . . . , and finally 5 packets in a last time period.

Optionally, the RDMA network adapter may send a same quantity of packets in each time period other than the last time period, and may send, in the last time period, packets of a quantity that is less than that of packets sent in another time period, for example, send five packets in the first time period, five packets in the second time period, . . . , and two packets in the last time period (only two to-be-sent packets are left in the last time period).

Figure 5:
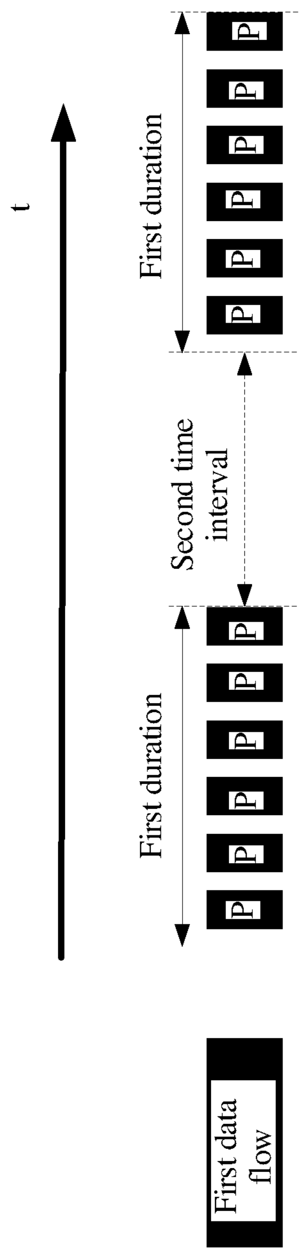
FIG. 5 is a schematic diagram of data transmission according to an embodiment of this application.

For example, as shown in FIG. 5, there is a to-be-sent data flow (a first data flow). Six packets of the first data flow are sent in one first duration, and another six packets of the first data flow are sent in one first duration following a second time interval. Subsequently, the first data flow is periodically sent in this manner. In this case, the first duration is greater than the first time interval, and the second time interval is equal to the first time interval (Flowlet Gap).

Optionally, no packet of the first data flow is sent in the second time interval. Optionally, in this case, some feedback frames, such as an ACK frame, may be sent in the second time interval, or no packet may be sent.

Optionally, a packet of a data flow in the at least one to-be-sent data flow other than the first data flow is sent in the second time interval.

Figure 6:
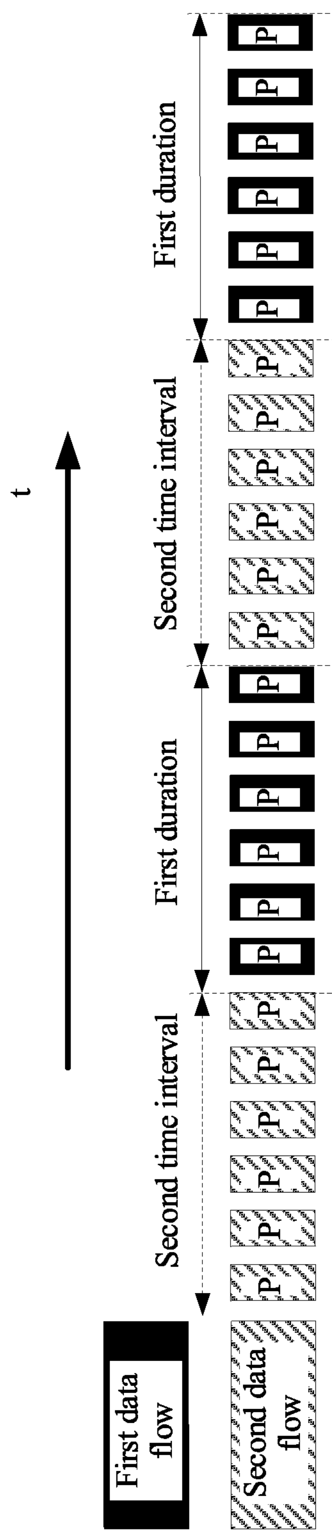
FIG. 6 is another schematic diagram of data transmission according to an embodiment of this application.

For example, as shown in FIG. 6, there are two to-be-sent data flows (a first data flow and a second data flow). Six packets of the first data flow are sent in one first duration, and another six packets of the first data flow are sent in one first duration following a second time interval. Six packets of a second data flow are sent in one second time interval, and six packets of the second data flow are sent in one second time interval following one first duration. Subsequently, the first data flow and the second data flow are periodically sent in this manner. In this case, the first duration is equal to the first time interval, and the second time interval is equal to the first time interval (Flowlet Gap).

Figure 7:
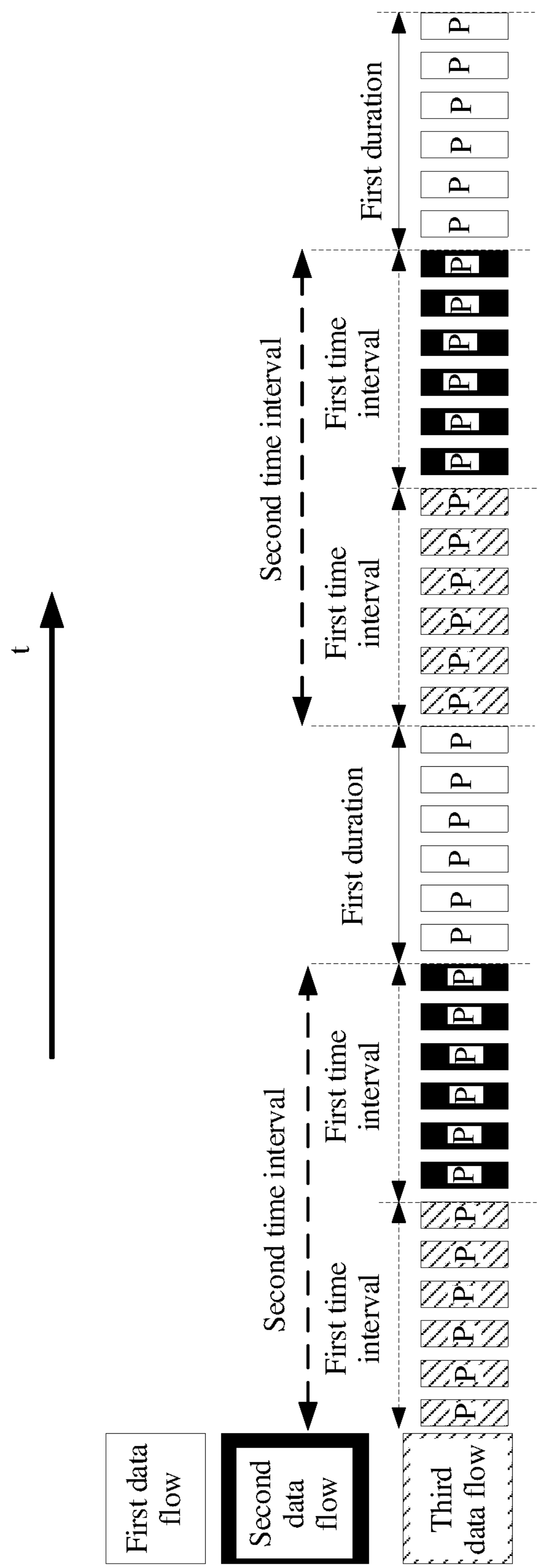
FIG. 7 is still another schematic diagram of data transmission according to an embodiment of this application.

For another example, as shown in FIG. 7, there are three to-be-sent data flows (a first data flow, a second data flow, and a third data flow). Six packets of the first data flow are sent in one first duration, and another six packets of the first data flow are sent in one first duration following a second time interval (which is twice a first time interval). Six packets of the second data flow are sent in one first time interval in a second time interval, and six packets of the third data flow are sent in another first time interval. Subsequently, the first data flow, the second data flow, and the third data flow are periodically sent in this manner. In this case, the first duration is equal to the first time interval.

Optionally, packets of different data flows may be sent in the second time interval.

Figure 8:
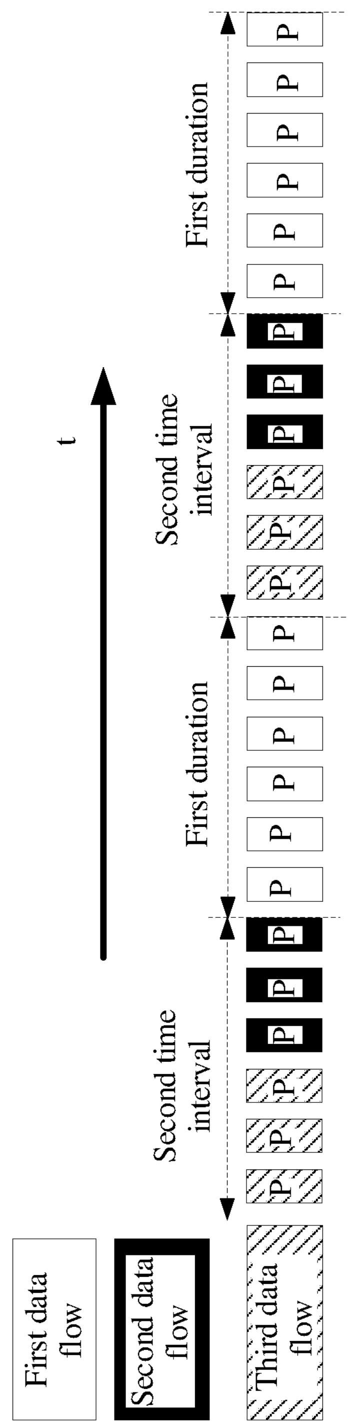
FIG. 8 is yet another schematic diagram of data transmission according to an embodiment of this application.

For another example, as shown in FIG. 8, there are three to-be-sent data flows (a first data flow, a second data flow, and a third data flow). Six packets of the first data flow are sent in one first duration, and another six packets of the first data flow are sent in one first duration following a second time interval. Three packets of the second data flow are first sent in a second time interval, and then three packets of the third data flow are sent. Subsequently, the first data flow, the second data flow, and the third data flow are periodically sent in this manner. In this case, the first duration is equal to the first time interval, and the second time interval is equal to the first time interval (Flowlet Gap).

It should be understood that, in the examples in FIG. 5 to FIG. 8, a quantity of packets sent in the first duration and a quantity of packets sent in the second time interval are merely examples. This embodiment of this application sets no limitation thereto.

Optionally, after the first duration is determined, a quantity of packets sent in one first duration may be calculated based on the first duration.

Specifically, a quantity of packets sent in one first duration=the first duration*a port rate/(8*maximum transmission unit). The port rate is in a unit of kbps, and the maximum transmission unit (MTU) is in a unit of byte. For example, an MTU in an Ethernet protocol may be 1500 bytes, and an MTU in a point to point protocol over Ethernet (PPPoE) may be 1492 bytes.

It should be understood that the port rate may be a port rate at which an RDMA network adapter sends packets, or may be a port rate at which a TOR switch sends packets.

Optionally, after a quantity of packets sent in one first duration is obtained through calculation, the RDMA network adapter may continuously send a plurality of packets of the first data flow, wherein a quantity of the plurality of packets is the same as the quantity of packets obtained through calculation, and continuously send packets of the first data flow after the second time interval.

Optionally, the RDMA network adapter sets different UDP source port numbers or TCP source port numbers separately for packets sent in two consecutive first durations.

Setting a UDP source port number is used as an example below for description.

Figure 9:
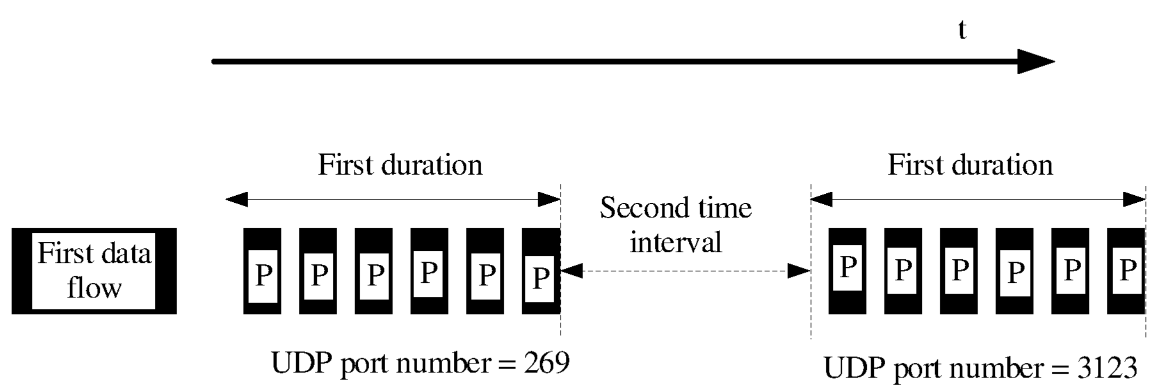
FIG. 9 is a schematic diagram of a port number setting in a data transmission process according to an embodiment of this application.

For example, as shown in FIG. 9, the RDMA network adapter sets a UDP source port number 3123 for a packet sent in one first duration, and sets a UDP source port number 269 for a packet sent in a next first duration.

Optionally, the RDMA network adapter sets different UDP source port numbers or TCP source port numbers separately for packets that are sent consecutively and that belong to different data flows.

Setting a UDP source port number is used as an example below for description.

Figure 10:
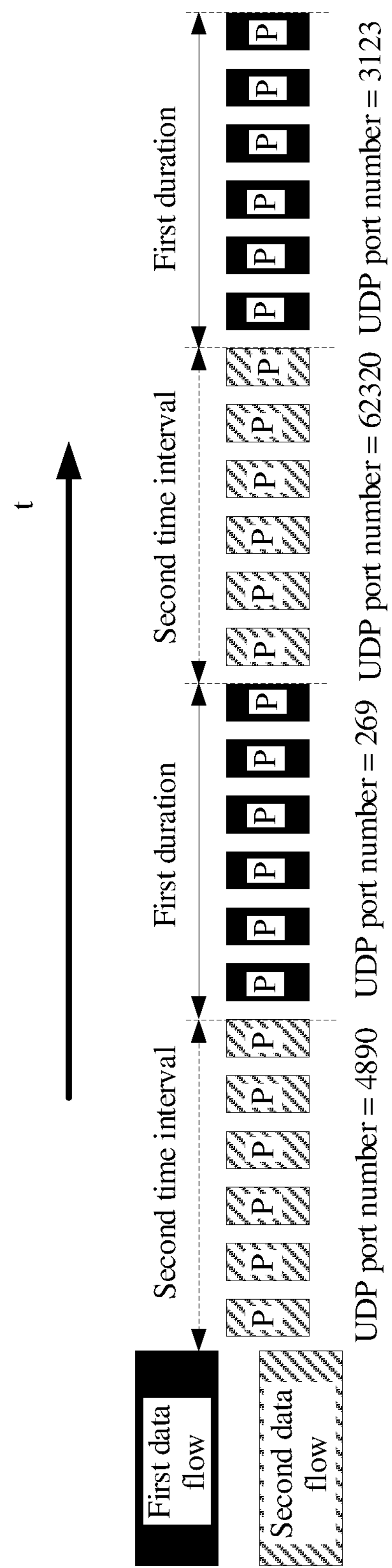
FIG. 10 is another schematic diagram of a port number setting in a data transmission process according to an embodiment of this application.

For example, as shown in FIG. 10, the RDMA network adapter sets a UDP source port number 3123 for a packet that is sent in one first duration and that belongs to a first data flow, sets a UDP source port number 62320 for a packet that is sent in a second time interval and that belongs to a second data flow, and sets a UDP source port number 269 for a packet that is subsequently sent in one first duration and that belongs to the first data flow.

Figure 11:
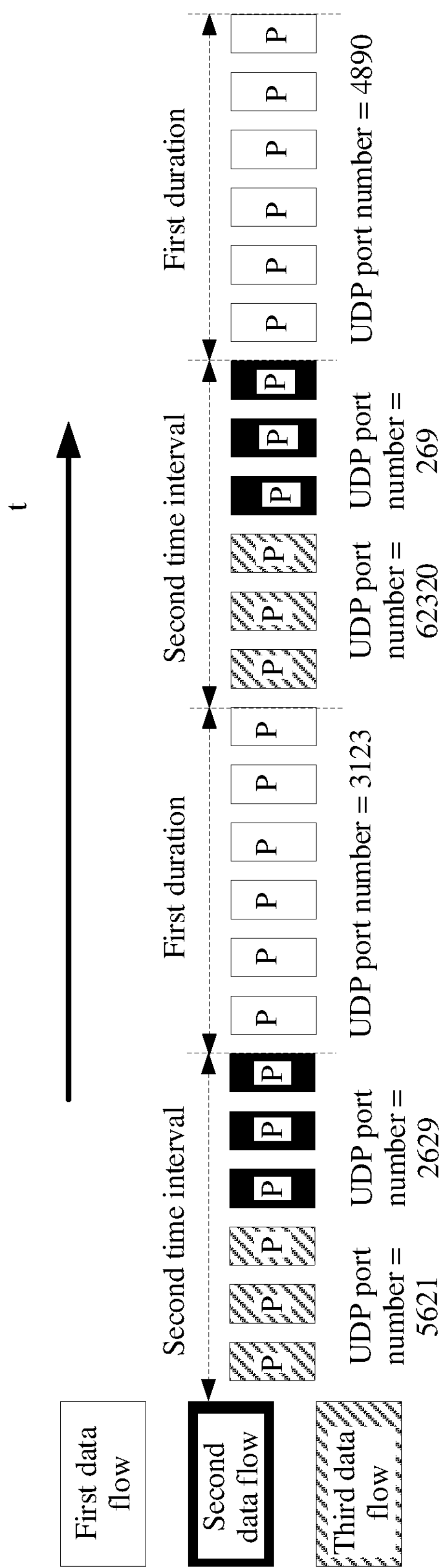
FIG. 11 is still another schematic diagram of a port number setting in a data transmission process according to an embodiment of this application.

For another example, as shown in FIG. 11, the RDMA network adapter sets a UDP source port number 4890 for a packet that is sent in one first duration and that belongs to a first data flow, sets a UDP source port number 269 for a packet that is subsequently sent in a second time interval and that belongs to a second data flow, sets a UDP source port number 62320 for a packet that is subsequently sent in the second time interval and that belongs to a third data flow, and sets a UDP source number 3123 for a packet that is subsequently sent in one first duration and that belongs to the first data flow.

Optionally, the RDMA network adapter sets a same UDP source port number or TCP source port number for packets sent in one first duration.

It should be understood that a UDP port or a TCP port in this embodiment of this application is a logical port, and a port number range may be 0 to 65535.

It should be further understood that, in the examples in FIG. 9 to FIG. 11, a specific port number set by the RDMA network adapter is merely an example. This embodiment of this application sets no limitation thereto. Optionally, when needing to set a port number, the RDMA network adapter may randomly allocate a port number.

Optionally, the RDMA network adapter may set a same UDP destination port number or TCP destination port number for the at least one to-be-sent data flow.

Optionally, in the RoCEv2 protocol, a well-known port number may be used to represent a destination port number of the at least one to-be-sent data flow. For example, the UDP destination port number of the at least one to-be-sent data flow may be set to a well-known port number 4791.

Optionally, as shown in FIG. 1, the method 300 in this embodiment of this application may be implemented on a server and a TOR switch.

For example, a first data flow needs to be sent from Server #1 to Server #3. An RDMA network adapter integrated into Server #1 may send a plurality of packets of the first data flow in a first time period, send a plurality of packets of the first data flow in a second time period following one second time interval, and send a plurality of packets of the first data flow in a third time period following one second time interval . . . . In this case, packets of the first data flow are sent periodically, to actively construct a sub-flow for the first data flow.

For another example, a first data flow needs to be sent from Server #1 to Server #3. After receiving packets of the first data flow, TOR access switch #1 may send a plurality of packets of the first data flow in a first time period, send a plurality of packets of the first data flow in a second time period following one second time interval, and send a plurality of packets of the first data flow in a third time period following one second time interval, and so on. In this case, packets of the first data flow are sent periodically, to actively construct a sub-flow for the first data flow.

For still another example, a first data flow needs to be sent from Server #1 to Server #3. After receiving packets of the first data flow, TOR #1 may send a plurality of packets of the first data flow in a first time period, send a plurality of packets of the first data flow in a second time period following one second time interval, and send a plurality of packets of the first data flow in a third time period following one second time interval, and so on. In this case, packets of the first data flow are periodically sent. In addition, different UDP source port numbers or TCP source port numbers are set separately for packets sent in each time period, so that packets sent in different time periods may be sent by using different paths. As shown in FIG. 1, the packets in the first time period may be sent from TOR switch #1 to SPINE switch #1, and then SPINE switch #1 sends the received packets to TOR access switch #3, and finally to Server #3. The packets in the second time period may be sent from TOR access switch #1 to SPINE switch #2, and then SPINE switch #2 sends the received packets to TOR access switch #3, and finally to Server #3.

Therefore, according to the data transmission method in this embodiment of this application, when at least one data flow is to be sent, a sub-flow is actively constructed for the data flow. This splits a data flow, eliminates continuous congestion on a port of a switched network, brings a good load balancing effect, and features easy implementation.

Further, a different UDP source port number or TCP source port number is set for each sub-flow of one data flow, so that load balancing of each sub-flow can be implemented when a switch supports an ECMP load balancing function that is based on a 5-tuple hash, and further congestion and a packet loss caused by network traffic load imbalance are addressed, and data transmission reliability is increased.

Figure 12:
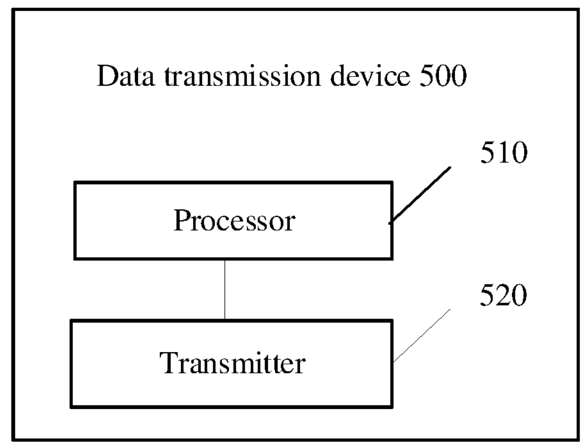
FIG. 12 is a schematic block diagram of a data transmission device according to an embodiment of this application.

FIG. 12 is a schematic block diagram of a data transmission device 500 according to an embodiment of this application. As shown in FIG. 12, the device 500 includes:

a processor 510, configured to calculate a first duration based on at least one to-be-sent data flow and a first time interval, where the first time interval is a preset value, and different data flows in the at least one to-be-sent data flow have different 5-tuples; and a transmitter 520, configured to send a first data flow, where the first data flow belongs to the at least one to-be-sent data flow; where a plurality of packets of the first data flow are sent in a first time period, packets of the first data flow are sent in a second time period following a second time interval, a duration of the first time period and a duration of the second time period are equal to the first duration, and the second time interval is greater than or equal to the first time interval.

Optionally, the transmitter 520 is further configured to send a packet of a data flow in the at least one to-be-sent data flow other than the first data flow in the second time interval.

Optionally, packets sent in the second time interval belong to different data flow.

Optionally, the processor 510 is further configured to set different UDP source port numbers separately for the packets sent in the first time period and the second time period.

Optionally, the processor 510 is further configured to set a same UDP source port number for packets sent in one first duration.

Optionally, the processor 510 is further configured to determine a quantity of to-be-sent data flows, where the first duration≥the first time interval/(the quantity of to-be-sent data flows−1).

Optionally, the processor 510 is further configured to, after a data flow is sent and/or one data flow is added, update the quantity of to-be-sent data flows.

Optionally, the processor 510 is further configured to calculate, based on the first duration, a quantity of packets sent in one first duration.

The transmitter 520 is further configured to continuously send a plurality of packets of the first data flow, wherein a plurality of the packets is the same as the quantity of packets obtained through calculation, and continuously send packets of the first data flow after the second time interval.

Optionally, the at least one to-be-sent data flow is a RoCEv2 flow carried over a converged Ethernet.

It should be understood that the foregoing and other operations and/or functions of the units of the data transmission device 500 in this embodiment of this application are separately used to implement corresponding procedures of the RDMA network adapter or the TOR switch in the method 300 in FIG. 3. For brevity, details are not described herein again.

Figure 13:
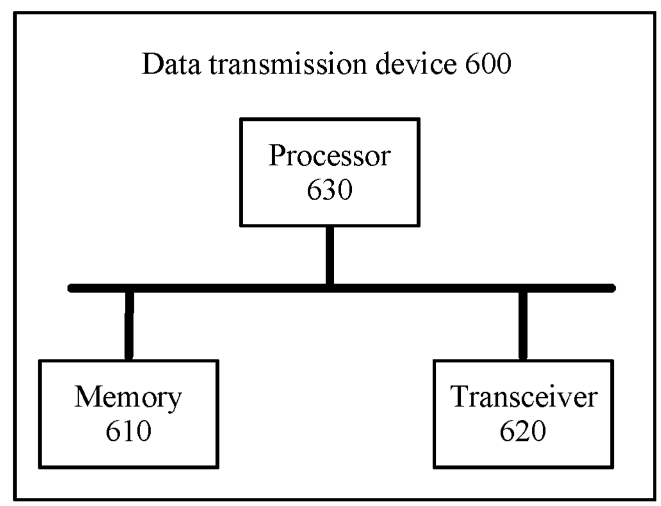
FIG. 13 is a schematic block diagram of a data transmission device according to an embodiment of this application.

FIG. 13 is a schematic block diagram of a data transmission device 600 according to an embodiment of this application. The device 600 includes:

a memory 610, configured to store a program, where the program includes code;

a transceiver 620, configured to communicate with another device; and a processor 630, configured to execute the program code stored in the memory 610.

Optionally, when the code is executed, the processor 630 may implement operations performed by the RDMA network adapter or the TOR switch in the method 300 in FIG. 3. For brevity, details are not described herein again. In this case, the device 600 may be an RDMA network adapter or a TOR switch integrated into a server. The transceiver 620 is configured to perform specific signal sending and receiving when driven by the processor 630.

It should be understood that in this embodiment of this application, the processor 630 may be a central processing unit (CPU), or the processor 630 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

The memory 610 may include a read-only memory and a random access memory, and provides the processor 630 with data and an instruction. A part of the memory 610 may further include a non-volatile random access memory. For example, the memory 610 may further store information of a device type.

The transceiver 620 may be configured to implement a signal sending and receiving function, such as a frequency modulation and demodulation function or an up-conversion and down-conversion function.

In an implementation process, at least one step of the foregoing method may be completed by using an integrated logic circuit of hardware in the processor 630, or the integrated logic circuit may complete the at least one step by using an instruction driver in a software form. Therefore, the data transmission device 600 may be a chip or a chip group. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory or electrically erasable programmable memory, or a register. The storage medium is located in the memory. The processor 630 reads information in the memory and completes the steps of the foregoing methods in combination with hardware of the processor. To avoid repetition, details are not described herein again.

A Person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of this application.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:

calculating a first duration based on at least one to-be-sent data flow and a first time interval, wherein the first time interval is a preset value; and sending a first data flow included in the at least one to-be-sent data flow; wherein a first set of packets of the first data flow are sent in a first time period, a second set of packets of the first data flow are sent in a second time period following a second time interval, a duration of the first time period and a duration of the second time period are both equal to the first duration, and the second time interval is greater than or equal to the first time interval.

2. The method according to claim 1, wherein the at least one to-be-sent data flow includes multiple data flows, the second time interval is immediately after the first time period, and the method further comprises:

sending, in the second time interval, at least one packet of one or more data flows in the at least one to-be-sent data flow other than the first data flow.

3. The method according to claim 2, wherein the at least one packet sent in the second time interval includes multiple packets belonging to different data flows in the at least one to-be-sent data flow.

4. The method according to claim 1, wherein the method further comprises:

setting different user datagram protocol (UDP) source port numbers respectively for the first set of packets sent in the first time period and the second set of packets sent in the second time period.

5. The method according to claim 1, wherein the method further comprises:

setting a same UDP source port number for packets sent in one time period having a duration equal to the first duration.

6. The method according to claim 1, wherein the at least one to-be-sent data flow are a plurality of to-be-sent data flows and the calculation of the first duration based on the at least one to-be-sent data flow and the first time interval comprises:

determining a quantity of the plurality of to-be-sent data flows, wherein the first duration≥the first time interval/(the quantity of the plurality of to-be-sent data flows−1).

7. The method according to claim 6, wherein the determination of the quantity of the plurality of to-be-sent data flows comprises:

after a data flow is sent or added, updating the quantity of the plurality of to-be-sent data flows.

8. The method according to claim 1, wherein the method further comprises:

calculating, based on the first duration, a quantity of packets to be sent in one time period having a duration equal to the first duration; and wherein the sending a first data flow comprises:

continuously sending the first set of packets of the first data flow, wherein a quantity of the first set of packets is the same as the calculated quantity of packets, and continuously sending the second set of packets of the first data flow after the second time interval.

9. The method according to claim 1, wherein the at least one to-be-sent data flow includes a RoCEv2 flow carried over a converged Ethernet.

10. A data transmission device, comprising:

at least one processor, configured to calculate a first duration based on at least one to-be-sent data flow and a first time interval, wherein the first time interval is a preset value; and a transmitter, configured to send a first data flow included in the at least one to-be-sent data flow; wherein a first set of packets of the first data flow are sent in a first time period, a second set of packets of the first data flow are sent in a second time period following a second time interval, a duration of the first time period and a duration of the second time period are both equal to the first duration, and the second time interval is greater than or equal to the first time interval.

11. The device according to claim 10, wherein the second time interval is immediately after the first time period, and the at least one to-be-sent data flow includes multiple data flows and the transmitter is further configured to send, in the second time interval, at least one packet of one or more data flows in the at least one to-be-sent data flow other than the first data flow.

12. The device according to claim 11, wherein the at least one to-be-sent data flow includes multiple data flows and the at least one packet sent in the second time interval includes multiple packets belonging to different data flows in the at least one to-be-sent data flow.

13. The device according to claim 10, wherein the at least one processor is further configured to set different user datagram protocol (UDP) source port numbers respectively for the first set of packets sent in the first time period and the second set of packets sent in the second time period.

14. The device according to claim 10, wherein the at least processor is further configured to set a same UDP source port number for packets sent in one time period having a duration equal to the first duration.

15. The device according to claim 10, wherein the at least one to-be-sent data flow are a plurality of to-be-sent data flows and the at least one processor is further configured to:

determine a quantity of the plurality of to-be-sent data flows, wherein the first duration≥the first time interval/(the quantity of the plurality of to-be-sent data flows−1).

16. The device according to claim 15, wherein the at least one processor is further configured to, after a data flow is sent or added, update the quantity of the plurality of to-be-sent data flows.

17. The device according to claim 10, wherein the at least one processor is further configured to calculate, based on the first duration, a quantity of packets to be sent in one time period having a duration equal to the first duration; and the transmitter is further configured to continuously send the first set of packets of the first data flow, wherein a quantity of the first set of packets is the same as the calculated quantity of packets, and continuously send the second set of packets of the first data flow after the second time interval.

18. The device according to claim 10, wherein the at least one to-be-sent data flow includes a RoCEv2 flow carried over a converged Ethernet.

19. The method according to claim 1, wherein the at least one to-be-sent data flow includes multiple data flows having different 5-tuples, each of the 5-tuples representing a source internet protocol address (src IP), a destination internet protocol address (dst IP), an Internet protocol address protocol (IP protocol), a source port (src Port), and a destination port (dst Port).

20. The device according to claim 10, wherein the at least one to-be-sent data flow includes multiple data flows having different 5-tuples, each of the 5-tuples representing a source internet protocol address (src IP), a destination internet protocol address (dst IP), an Internet protocol address protocol (IP protocol), a source port (src Port), and a destination port (dst Port).

* * * * *